United States Patent
Porikli et al.

(10) Patent No.: US 7,813,528 B2
(45) Date of Patent: Oct. 12, 2010

(54) METHOD FOR DETECTING OBJECTS LEFT-BEHIND IN A SCENE

(75) Inventors: Fatih M. Porikli, Watertown, MA (US); Yuri A. Ivanov, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 859 days.

(21) Appl. No.: 11/697,052

(22) Filed: Apr. 5, 2007

(65) Prior Publication Data

US 2008/0247599 A1 Oct. 9, 2008

(51) Int. Cl.
*G06K 9/00* (2006.01)

(52) U.S. Cl. .................. 382/103; 382/190; 348/155

(58) Field of Classification Search .............. 382/103, 382/190; 348/155
See application file for complete search history.

(56) References Cited

U.S. PATENT DOCUMENTS

2006/0262959 A1 11/2006 Tuzel et al.

OTHER PUBLICATIONS

Porikli et al., "Bayesian Background Modeling for Foreground Detection", 2005, ACM, 1-6.*
Aubert, D et al.; "Time-Scale Change Detection Applied to Real-Time Abnormal Stationarity Monitoring" Real-time Imaging, Academic Press Limited, GB; vol. 10; No. 1, Feb. 1, 2004; pp. 9-22.
Gibbins D et al.; "Detecting Suspicious Background Changes in Video Surveillance of Busy Scenes" Applications of Computer Vision; 1996; WACV 1996; Proceedings 3rd IEEE Workshop on Sarasota, Fl. USA Dec. 2-4, 1996, Los Alamitos, CA, USA; IEEE Computer Society, US Dec. 2, 1996, pp. 22-26.
J. D. Courtney, "Automatic Video Indexing Via Object Motion Analysis," PR 30(4), pp. 607-625, 1997.
E. Auvinet et al., "Left-Luggage Detection Using Homographies and Simple Heuristics", PETS, pp. 51-58, 2006.
J. M. Del Rinen et al., "Multi-View Detection and Tracking Using Multi-Camera UKF" in PETS, pp. 59-66, 2006.
P.T.N. Krahnstoever et al., Multi-View Detection and Tracking of Travelers and Luggage in Mass Transit Environments in PETS pp. 67-74, 2006.
K. Smith et al., "Dection Abandoned Luggage Items in a Public Space," in PETS, pp. 75-82, 2006.
S. Guler et al., "Abandoned Object Detection in Crowded Places," in PETS, pp. 99-106, 2006.

* cited by examiner

*Primary Examiner*—Vikkram Bali
*Assistant Examiner*—Katrina Fujita
(74) *Attorney, Agent, or Firm*—Dirk Brinkman; Gene Vinokur

(57) ABSTRACT

A method detects an object left-behind in a scene by updating a set of background models using a sequence of images acquired of the scene by a camera. Each background model is updated at a different temporal scales ranging from short term to long term. A foreground mask is determined from each background model after the updating for a particular image of the sequence. A motion image is updated from the set of foreground masks. In the motion, image, each pixel has an associated evidence value. The evidence values are compared with a evidence threshold to detect and signal an object left behind in the scene.

13 Claims, 3 Drawing Sheets

200

Given: New sample $\mathbf{x}$, background layers $\{(\theta_{t-1,i}, A_{t-1,i}, \kappa_{t-1,i}, v_{t-1,i})\}_{i=1..k}$ Sort layers according to confidence measure defined in (14). $i \leftarrow 1$.

while $i < k$

Measure Mahalanobis distance:

$d_i \leftarrow (\mathbf{x} - \mu_{t-1,i})^T \Sigma_{t-1,i}^{-1} (\mathbf{x} - \mu_{t-1,i})$.

if sample $\mathbf{x}$ is in 99% confidence interval then update model parameters according to equations (7), (8), (9) and stop.

else update model parameters according to equation (16).

$i \leftarrow i + 1$

Delete layer $k$, initialize a new layer having parameters defined in equation (10).

*Fig. 3*

METHOD FOR DETECTING OBJECTS LEFT-BEHIND IN A SCENE

FIELD OF THE INVENTION

The present invention relates generally to segmenting a sequence of images acquired of a scene by a camera into background and foreground portions, and more particularly to detecting objects that have been left-behind in the scene.

BACKGROUND OF THE INVENTION

In video surveillance applications, it is common to segment a sequence of images acquired of a scene by a camera into background and foreground portions so that objects in the scene can be detected and tracked. It is often assumed that the background portion is completely static, or slowly or periodically changing, while the foreground portion corresponds to groups of adjacent pixels that change much more rapidly than the pixels in the background portion.

A number of background subtraction methods are known that are robust to changes in lighting, pixel noise, camera position, and the like. A simple method marks the pixels in an image whose values are different from those of an image of the scene without any foreground objects. Such a method is often used for indoor scenes where the lighting and scene geometry can be tightly controlled.

To handle multimodal backgrounds, a background model can be used. Often, the model is in the form of Gaussian distributions. The back ground model is updated, for each successive image or frame by an iterative update mechanism, e.g., on-line expectation maximization (EM). However, on-line EM blends weak modes into stronger ones and distorts the model mean values.

To achieve accurate adaptation of background models, a Bayesian update procedure can be used, which, can also estimate the number of required models. That procedure can handle illumination variations and other arbitrary changes in the scene. There are also variants of a mixture of model background that uses image gradient and optical flow information. The mixture of model approaches can converge to any arbitrary distribution provided enough observations. However, the computational cost grows exponentially as the number of models in the mixture increases.

Another background modeling method uses non-parametric kernel density estimation. That method stores color values of pixels in the images in the sequence and estimates the contributions of a set of kernel functions using all of the data instead of iteratively updating background models at each frame. Both memory and computational cost are proportional to the number of images. As a result, kernel, based methods are impractical for real-time applications that acquire images continuously over long time.

Another 3D geometry-based method allows arbitrary changes in illumination but assumes that the background is geometrically static. That method uses a stereo camera. Pixels that violate a pre-computed disparity model of the empty scene are marked as the foreground.

Frequency-based techniques have good results when motion in the background is strongly periodic. For instance, coastal surveillance systems can take into account the periodicity of ocean waves and effectively remove that effect by modeling pixel-wise periodicity of the observations explicitly.

Another segmentation method adapts to the color composition of foreground objects while maintaining a model of the background. Even though that method aims to combine the benefits of pixel-, motion-, and region-based techniques, it has problems with periodic motion as well as non-convex objects. Prior knowledge can be integrated to the background detection. Due to the computation of full covariance matrix, feature space can be modified to include other information sources, such as motion information.

However, there is a class of problems, which conventional two-class segmentation methods cannot solve. Common sense dictates that an object left-behind in public places, such as a suitcase, backpack, or a package, can pose a significant security risk. Unfortunately, such an object does not qualify as either background or foreground. When the object enters the scene it is foreground. After being left-behind, the object is background. However, it is crucial that the object is not totally ignored. Furthermore, it is possible, still later, that the object is removed. Therefore, its presence in the scene should not be forgotten.

Methods are known that can detect left-behind objects, J. D. Courtney, "Automatic video indexing via object motion analysis," PR 30(4), pp. 607 625, 1997, E. Auvinet, E. Grossmann, C. Rougier, M. Dahmane, and J. Meunier, "Left-luggage detection, using homographies and simple heuristics," PETS, pp. 51-58, 2006, J. M. del Rincn, J. E. Herrero-Jaraba, J. R. Gmez, and C. Orrite-Uruuela, "Automatic left luggage detection and tracking using multi-camera ukf," in PETS, pp. 59-66, 2006, P. T. N. Krahnstoever, T. Sebastian, A. Perera, and R. Collins, "Multi-view detection and tracking of travelers and luggage in mass transit environments," in PETS, pp. 67-74, 2006, K. Smith, P. Quelhas, and D. Gatica-Perez, "Detecting abandoned luggage items in a public space," in PETS, pp. 75-82, 2006, and S. Guler and M. K. Farrow, "Abandoned object detection in crowded places" in PETS, pp. 99-106, 2006.

The main drawback of most prior art methods is the fact that in order to identify portions of the video images corresponding to an object that has been left-behind, those methods require solving a much harder problem of object tracking or object detection as an intermediate step. Tracking objects in complex real-world scenes and in real-time is difficult.

SUMMARY OF THE INVENTION

The embodiments of the invention provide a method for detecting a left-behind object by segmenting a sequence of images acquired of a scene by a camera into background and foreground portions. For example, the sequence of images comprise a surveillance video, and some, but not all, of the foreground corresponds can correspond to an object that was left-behind.

As an advantage, the method does not require object tracking, which, eliminates the possibility of inter-frame correspondence failures, common in tracking procedures. However, the method can be integrated with tracking procedures to improve the accuracy of the left-behind object detection method.

The method does not require a model of the scene or the object. The method is primarily concerned with temporal aspects of pixel changes. Therefore, the method does not need to be trained to compensate for particular imaging conditions, such as camera angle, illumination, etc. The method can use parallelization to decrease processing time.

The method analyzes motion in the scene at multiple temporal scales and constructs long-term and short-term background models, implemented as per pixel mixtures of Gaussian distributions. Then, a Bayesian update mechanism, is used to adapt both models. Subsequently, the method recursively estimates long-term and short-term background statistics by comparing each image with the long-term and short-term background models. These statistics are used to differentiate between pixels that belong to the primarily static background portions of the scene, the active foreground portions, and the left-behind object, which has been static for some amount of time.

BRIEF DESCRIPTION OF THE PREFERRED EMBODIMENTS

FIG. 3 is a block diagram, of pseudo code of a procedure for updating background model parameters according to an embodiment of the invention.

DETAILED DESCRIPTION OF THE PREFERRED EMBODIMENTS

Figure 1:
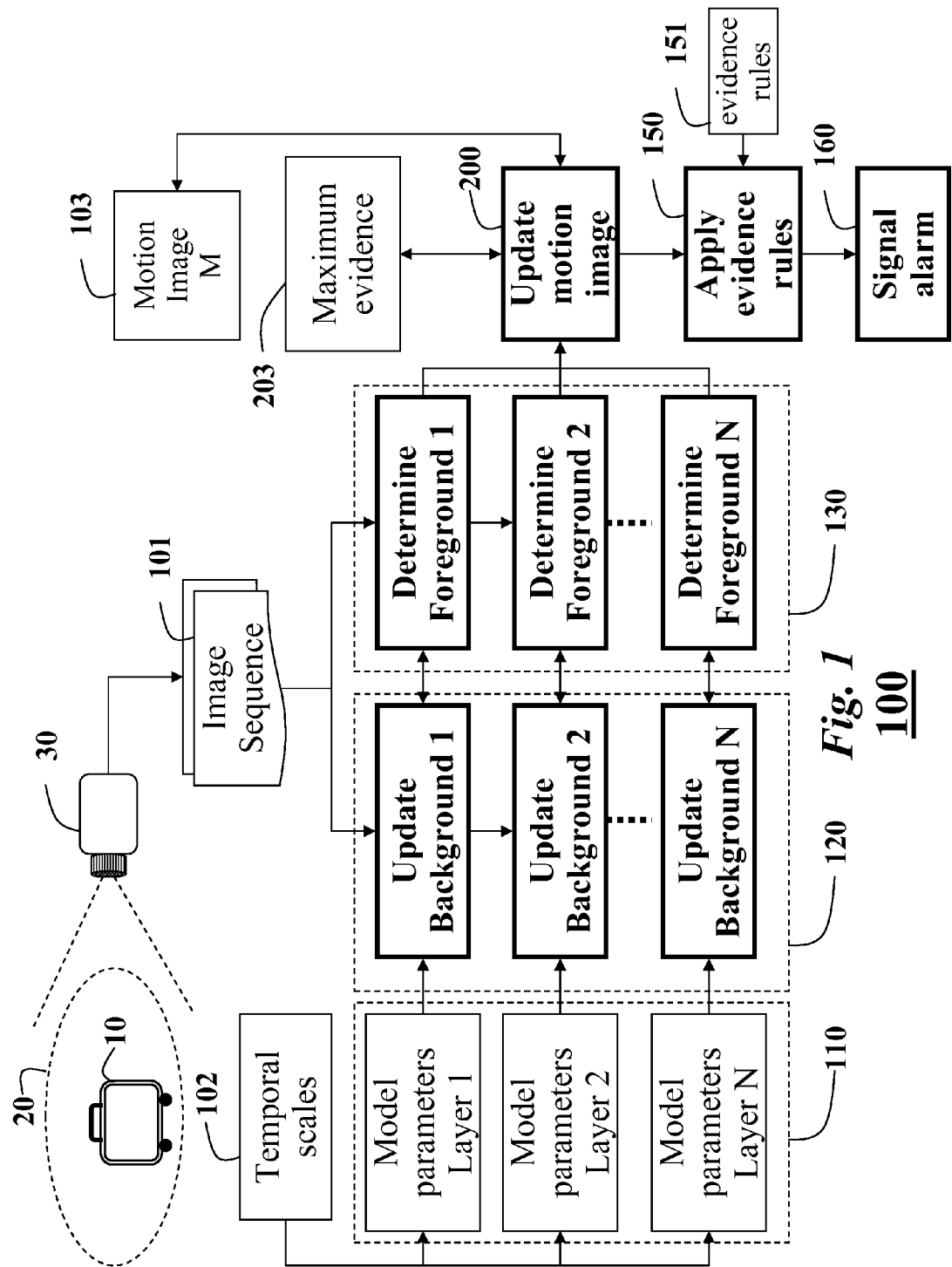
FIG. 1 is a flow diagram of a method for detecting an object left behind in a scene according to an embodiment of the invention.

FIG. 1 shows a method 100 for detecting an object 10 left-behind in a scene 20 according to embodiments of our invention. A camera 30 acquires a sequence of image 101 of the scene, e.g., the camera is a surveillance camera.

Our left-behind object detection method is based on an inference of pixel color evolution over time. The left-behind object can be considered as a static object in the scene, which was not there before. This observation indicates that by modeling 120 the background, which refers to long-term, static background regions, and modeling 130, we can deduce whether a pixel in the sequenced of image corresponds to a left-behind object or not. If the object is left-behind for an extended amount of time an alarm can be signaled 160.

Our method analyzes a temporal evolution of changing pixel intensities in a surveillance video at multiple time scales 102. Therefore, we maintain parameters 110 of the background model at multiple time scales. The method takes one step forward in time as each new image processed.

As is described below, the parameters 110 are maintained as multiple layers. That is, each pixel is represented, over time, as layers of 3D multivariate Gaussian distributions. The parameters 110 define the Gaussian distributions at any point in time, e.g., each image in the sequence. As used herein, time and images are essentially synonymous, because the images are acquired at a known frame rate.

After we update 120 the background model, we can determine 130 the foreground model. The foreground model is used to maintain 200 a motion image 103, see FIG. 2. Evidence rules 151 are applied 150 to the motion image 103, and the alarm can be signaled 160 if a left-behind object is detected.

Temporal Scales

The main idea is that the short-term stationary object 10 can be segmented from both the background and the foreground if the sequence of images 101 is analyzed on the multiple temporal scales 102. Our adaptive background update 120 removes slowly adapting background pixels and fast adapting foregrounds pixels from the video. The pixels that remain belong to the class of objects that move faster or more frequently than the background, but slower than the foreground, so that only pixels that correspond to left-behind objects remain in the motion image 103.

The temporal scales are entirely relative and depend, to a large extent, upon the application and class of objects that are detected. For a surveillance application, such as surveillance of a train station, where people and object move relative rapidly, short term might be a fraction of a minute, and long term five to ten minutes. In an illegal vehicle parking monitoring system, short term may be fifteen minutes, while long terra can be a couple of hours. If the parking facility is at an airport, then long term could be more than a week, to detect abandoned cars. For medical applications, such as MRI and CAT scan, imaging anatomical fluids, the term can be in the order of minutes or hours.

Background Models

The scene background is represented by a model that extracts statistically consistent information for extended durations e.g. tens of minutes, depending on a time duration setting. The intermittent foreground pixels are differentiated from the left-behind object 10 by maintaining evidence values in the motion image 103 that the pixels are short-term. Thus, we analyze motion in the scene at the multiple temporal scales 102, and construct two background models in two parts.

The background model includes a long-term, background ($B_L$) model, and a short-term background ($B_S$) model. These two models use a mixture of Gaussian distributions. The distributions can be 1D, 2D or higher dimensionalities. We employ a Bayesian update 120 mechanism to accurately adapt the models. The statistics are used to differentiate between pixels that properly belong to the static background parts of the scene, and pixels that belong to the active foreground, and pixels that belong the left-behind objects, which have been static for an extended period of time. At every successive frame or image, we estimate the long-term and short-term statistics by comparing the current frame I with the BL and BS models.

Foreground Masks

Figure 2:
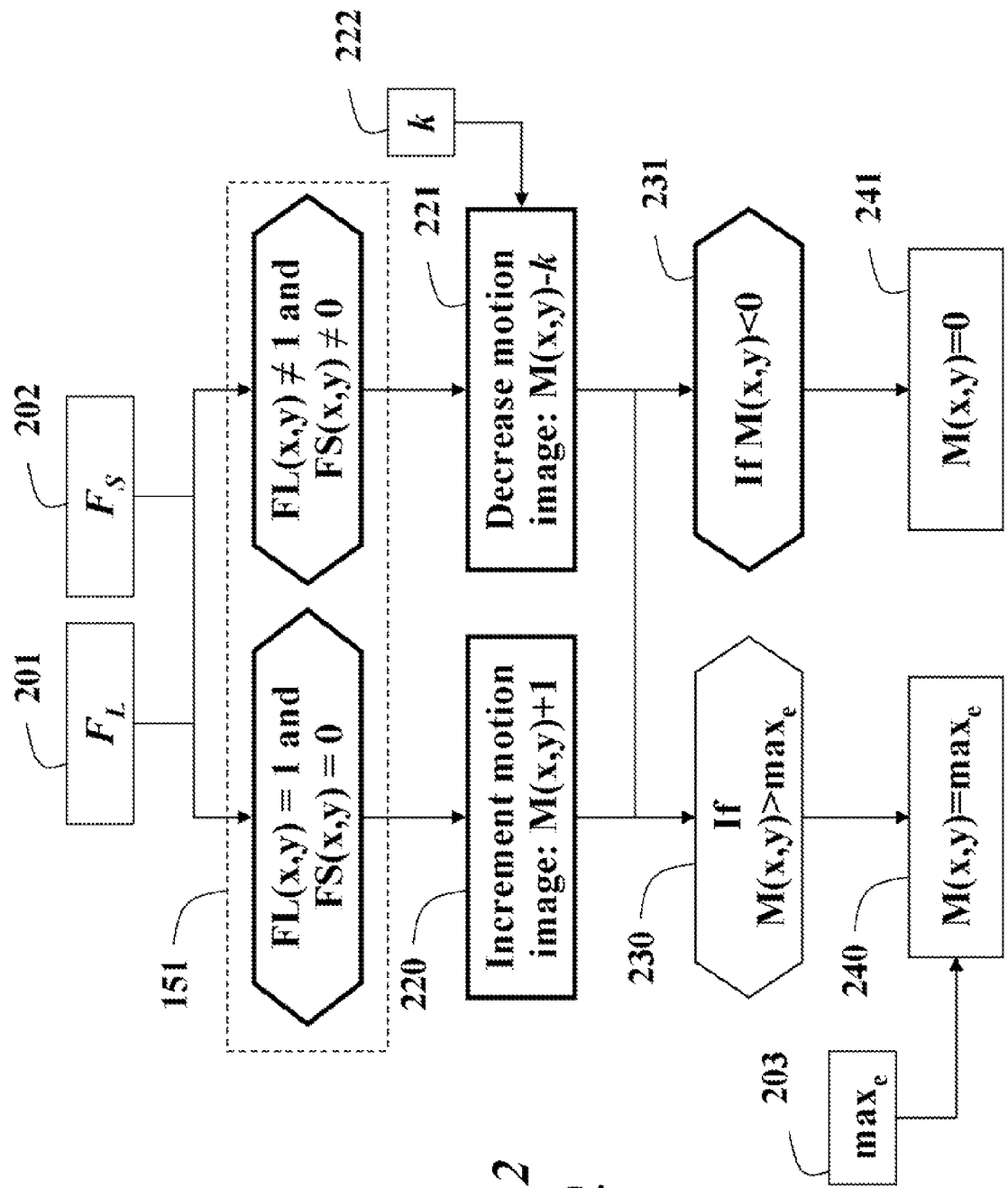
FIG. 2 is a flow diagram of a procedure for maintaining a motion image according to an embodiment of the invention.

We also determine 130 a foreground model, see FIG. 2. This model also has two parts, a long-term foreground ($F_L$) mask 201, and a short-term foreground ($F_S$) mask 202. Pixels $F_S(x, y)$ and $F_L(x, y)$ in the masks can be either zero or one. That is, the masks are binary images. The $F_L$ mask indicates changes in the scene for the current image that were was not there in previous images, e.g., moving objects, temporarily static objects, moving cast shadows, sudden drastic illumination changes to which the background models fail to adapt, e.g., noise. The $F_S$ mask corresponds to objects that were moving and then become stationary for a short period of time. The pixels can also indicate sudden changes due to noise as in the $F_L$ mask.

Mask Hypothesis

There are four hypotheses that can be made from the foreground masks according to the evidence rules 151:

1) $F_L(x, y)=0$ and $F_S(x, y)=0$. The pixel (x, y) corresponds to the background, and the corresponding pixel 1(x, y) in the current image is represented in both the $B_L$ and $B_S$ models;

2) $F_L(x, y)=1$ and $F_S(x, y)=1$, The pixel (x, y) corresponds to a moving object and is not represented in either the $B_L$ or $B_S$ models;

3) $F_L(x, y)=0$ and $FS(x, y)=1$. The pixel (x, y) corresponds to scene background, and the pixel 1(x, y) in the current image is only represented in the $B_L$ model; and 4) $F_L(x, y)=1$ and $F_S(x, y)=0$, The pixel (x, y) may correspond to a left-behind object may be represented in the $B_L$ model.

Confidence Values

As described above, our background models use mixtures of Gaussian distributions. Associated with the models are statistical confidence values. For pixels with, intensity change over only a relatively short time duration, the confidences of neither the $B_L$ model nor the $B_S$ model increase sufficiently to make the pixels valid background pixels. Thus, the pixels are determined 130 to be foreground. If the $B_S$ model 'blends' pixels into the background but the $B_L$ model still marks the pixels as foreground, then the pixel is considered to be a left-behind object pixel. If pixel intensity changes take more time, then both models consider the pixels as background.

Motion Image

To impose temporal constraints on the sensitivity of the detection and also to remove artifacts due to noise, we maintain 200 the image-wise detection results into the motion image $M(x, y)$ 103 by incrementing and decrementing 200 the pixel-wise evidence values in the motion image 103, using the evidence rules 151, as $$M(x, y) = \begin{cases} M(x, y) + 1 & F_L(x, y) = 1 \wedge F_S(x, y) = 0 \\ M(x, y) - k & F_L(x, y) \neq 1 \vee F_S(x, y) \neq 0 \\ max_e & M(x, y) > max_e \\ 0 & M(x, y) < 0 \end{cases} \quad (1)$$

where a threshold $max_e$ 203 and a delay constant k 222 are positive numbers.

The evidence rules 151 increment 220 the evidence values of the pixels in the motion image if the corresponding pixels in the long-term and short-term masks could be associated with the left-behind object. Otherwise, the evidence values of the pixels in the motion image are decremented 221 by the constant k. If the evidence values in the motion image become less than zero 231, then the evidence values are is set 241 back to zero.

Evidence Threshold

For each pixel, the motion image M 103 maintains an evidence value of a left-behind object. If this evidence value is larger than the threshold $max_e$ 203, that is $M(x, y) > max_e$ 230, then we mark 240 the pixel as a left-behind object pixel and generate the optional alarm signal 160. The evidence threshold $max_e$ 203 is defined in term of a number of successive images, i.e., time. The threshold can depend on a desired responsiveness and noise characteristics of our method. When the images are contaminated by noise, higher values of $max_e$ are preferred. Such high values also lower the false alarm rate.

A typical range for the evidence threshold $max_e$ is [10, 300] successive images. The decay constant k 222 adjusts what should happen in case the left-behind object is removed from the scene. If it is required to signal the alarm immediately after the object is removed, then the value of decay constant k should be large, e.g., $k=max_e$, i.e., the same parameter can be used for the alarm and the decay.

Relatively large values for the decay constant generate satisfying results. Note that neither of the background models and their mixture models depends on the above thresholds. This means, the detection is robust against the variations of this application specific evidence and the decay constant. Thus, these parameter values can be set comfortably to any suitable value.

Sequential Bayesian Update

The long-term and short-term parts of the background model are adapted by a Bayesian update procedure, see FIG. 3. The Bayesian update is described in greater detail in United States Patent Application 20060262959 by Tuzel et al, published Nov. 23, 2006, "Modeling low frame rate videos with Bayesian estimation," incorporated herein by reference.

Our update procedure maintains the multimodality of the background model. At each update, at most one layer is updated, from the current observations (image 1). This assures a minimum overlap over the layers. We also determine how many layers are necessary for each pixel and use only those layers during the foreground segmentation phase. This is performed with an embedded confidence score.

Each pixel, is defined as multiple layers of 3D multivariate Gaussian distributions. Each layer corresponds to a different appearance of the pixel. We perform our operations in the RGB color space. Using a Bayesian approach, we do not estimate the mean and variance of each layer. Instead, we estimate the probability distributions of the mean and the variance.

We can extract statistical information regarding to the mean and the variance from the probability distributions. Then, we use the expectation of the mean and the variance for change detection, and the variance of the mean as our confidence measure.

Layer Model

Image data, i.e., pixel intensities, are assumed to be normally distributed with a mean $\mu$ and covariance $\Sigma$. The mean and variance are unknown and modeled as random variables. Using Bayes theorem, a joint posterior density can be written as:

$$p(\mu, \Sigma | X) \propto p(X | \mu, \Sigma) p(\mu, \Sigma). \quad (2)$$

To perform a recursive Bayesian estimation with a new observations, the joint prior density $p(\mu, \Sigma)$ has the same form as the joint posterior density $p(\mu, \Sigma | X)$. Conditioning on the variance, the joint prior density is $$p(\mu, \Sigma) = p(\mu | \Sigma) p(\Sigma). \quad (3)$$

The above condition is realized if we assume an inverse Wishart distribution for the covariance and, conditioned on the covariance, a multivariate normal distribution for the mean. The inverse Wishart distribution, is a multivariate generalization of a scaled inverse-$\chi^2$ distribution. The parametrization of the covariance and the mean are respectively $$\Sigma \sim \text{Inv-Wishart}_{\upsilon_{t-1}}(\Lambda_{t-1}^{-1})$$

$$\mu | \Sigma \sim N(\theta_{t-1}, \Sigma/\kappa_{t-1}). \quad (5)$$

where $\mu_{t-1}$ is the degrees of freedom, and $\Lambda_{t-1}$ is the scale matrix for the inverse Wishart distribution, $\theta_{t-1}$ is the prior mean, and $\kappa_{t-1}$ is the number of prior measurements. With these assumptions, the joint prior density is $$p\left(\mu, \sum\right) \propto \left|\sum\right|^{-((\upsilon_{t-1}+3)/2+1)} \times e^{\left(-\frac{1}{2}tr(\Lambda_{t-1}\Sigma^{-1}) - \frac{\kappa_{t-1}}{2}(\mu-\theta_{t-1})^T \Sigma^{-1}(\mu-\theta_{t-1})\right)} \quad (6)$$

for three dimensional feature space. We label this density as normal-inverse-Wishart($\theta_{t-1}, \Lambda_{t-1}/\kappa_{t-1}; \upsilon_{t-1}, \Lambda_{t-1}$).

Multiplying the prior density with the normal likelihood, and arranging the terms, the joint posterior density becomes normal-inverse-Wishart($\theta_t, \Lambda_t/\kappa_t; \upsilon_t, \Lambda_t$)

with, the parameters updated as $$\upsilon_t = \upsilon_{t-1} + n \quad \kappa_n = \kappa_{t-1} + n, \quad (7)$$

$$\theta_t = \theta_{t-1} \frac{\kappa_{t-1}}{\kappa_{t-1}+n} + \overline{X} \frac{n}{\kappa_{t-1}+n}, \text{ and} \quad (8)$$

$$\Lambda_t = \Lambda_{t-1} + \sum_{i=1}^{n}(X_i - \overline{X})(X_t - \overline{X})^T + n\frac{\kappa_{t-1}}{\kappa_t}(\overline{X} - \theta_{t-1})(\overline{X} - \theta_{t-1})^T, \quad (9)$$

The new parameters combine the prior information with the observed samples. The posterior mean $\theta_t$ is a weighted average of the prior mean and the sample mean. Note, the sample value can either be pixel intensity, pixel color, or intensity gradient magnitude. The posterior degrees of freedom are equal to the prior degrees of freedom plus the sample size.

In equation (8), the first term corresponds to the current background, and the second additive term influences how much the background is changed by the current image. Note that, the denominator in both terms is the same. If $k_{t-1}$, then n is the controlling parameters.

In the above equations, the weight n is related to the temporal scale of 'learning' the parameters of the distributions. If the learning parameter or weight n is low, than the current image has a relative small additive impact on the background image, and the background reflects short term evolution of the scene, if the weight n is large, then the current changes the background more drastically, reflecting the long-term evolution of the scene.

The method is started with the following initial parameters:

$$\kappa_0=10, \upsilon_0=10, \theta_0=x_0, \Lambda_0=(\upsilon_0-4)16^2 I, \quad (10)$$

where I is the three dimensional identity matrix.

Integrating the joint posterior density with respect to the covariance $\Sigma$, we obtain the marginal posterior density for the mean:

$$p(\mu|X) \propto t_{\upsilon_t-2}(\mu|\theta_t,\Lambda_t/(\kappa_t(\upsilon_t-2))), \quad (11)$$

where $t_{\upsilon_t}-2$ is a multivariate t-distribution with $\mu_t-2$ degrees of freedom.

We use the expectations of marginal posterior distributions for the mean and the covariance as our model parameters at time (image) t. The expectation for the marginal posterior mean, i.e., the expectation of the multivariate t-distribution becomes:

$$\mu_t = E(\mu|X) = \theta_t, \quad (12)$$

and the expectation of the marginal posterior covariance, i.e., the expectation of the inverse Wishart distribution, becomes:

$$\Sigma_t = E(\Sigma|X) = (\upsilon_t-4)^{-1}\Lambda_t.$$

Our confidence measure for the layer is equal to one over the determinant of the covariance of $\mu|X$:

$$C = \frac{1}{|\Sigma_{\mu|X}|} = \frac{\kappa_t^3(\upsilon_t-2)^4}{(\upsilon_t-4)|\Lambda_t|}. \quad (14)$$

We can decrease processing time by making independence assumption on the color channels. Therefore, we separate the RGB color channels, and process each channel independently. Instead of having a multivariate Gaussian for a single layer, we use three univariate Gaussian distributions that correspond to each color channel. After updating each color channel independently, we join the variances and generate a diagonal covariance matrix:

$$\sum_t = \begin{pmatrix} \sigma_{t,r}^2 & 0 & 0 \\ 0 & \sigma_{t,g}^2 & 0 \\ 0 & 0 & \sigma_{t,b}^2 \end{pmatrix}. \quad (15)$$

For each univariate Gaussian distribution, we assume a scaled inverse-$\chi^2$ distribution for the variance and conditioned on the variance univariate normal distribution for the mean.

Background Update

We initialize our method with k layers for each pixel, e.g., k is three to five, depending on the dynamics and complexity of the scene. More layers can also be used. As we process new samples for each pixel, we update the parameters for our background model. We start our update from the most confident layer in our model. If the observed sample is inside the 99% confidence interval of the current model, then the parameters of the model are updated as expressed in Equations (7), (8) and (9). Lower confidence models are not updated. For background modeling, it is useful to have a 'forgetting' mechanism so that earlier observations have less effect on the model. Forgetting is performed by reducing the number of prior observations parameter of an unmatched model. If the current sample is not inside the confidence interval, then we update the number of prior measurements parameter:

$$\kappa_t = \kappa_{t-1} - n, \quad (16)$$

and proceed with the update of next confident layer. We do not let $\kappa_t$ become less than the initial value often. If none of the models are updated, then we delete the least confident layer and initialize a new model having the current sample as the mean and the initial variance.

Pseudo code for the update procedure for a single pixel is shown in FIG. 3. For a new sample x, background layers:

$$\{(\theta_{t-1,i},\Lambda_{t-1,i},\kappa_{t-1,i},\upsilon_{t-1,i})\}i=1,k,$$

The layers are sorted according to confidence measure defined in Equation (14), and 1 is initialized to 1, then while i<k, we measure Mahalanobis distance:

$$d_i \leftarrow (X-\mu_{t-1,i})^T \sum_{t-1,i}^{-1}(X-\mu_{t-1,i}).$$

If the sample x is in the 99% confidence interval, then we update the model parameters according to Equations (7), (8), (9) and stop. Else, we else update the model parameters according to Equation (16), and increment i. We delete layer k, and initialize a new layer having parameters defined in Equation (10).

Thus, we do not deform our models with noise or foreground, pixels, and easily adapt to smooth intensity changes like lighting effects. The embedded confidence score determines the number of layers to be used and prevents unnecessary layers. Usually, secondary layers correspond to a shadowed form of the background pixel, or different colors of a moving regions of the scene. If the scene is unimodal, then the confidence scores of layers other than, the first layer becomes very low.

Foreground Segmentation

Background statistics are used to detect changed regions of the scene, e.g., foreground objects. The number of layers required to represent a pixel is not known beforehand. Therefore, the background is initialized with more layers than needed, we use the confidence scores to determine how many layers are significant for each pixel. We order the layers according to the confidence score of Equation (14), and select the layers having confidence value greater than, a predetermined layer threshold $T_c$. We refer to these layers as confident layers.

The threshold $T_c$ is dependent on the covariance of the mean of the pixel so the threshold is dependent on the color range of the pixel. We perform our operations on pixel intensity values in the range [0-255], and select $T_c=1.0$. For other ranges, the threshold $T_c$ can be modified. We measure the Mahalanobis distance of observed color (RGB intensities) from the confident layers. Pixels that are outside of the 99% confidence interval of all confident layers of the background are considered as foreground pixels.

Connected Component Analysts

We can also apply connected component analysis to the motion image to determine a size or pattern (shape) of the object. For example, the method can be adjusted to detect only small objects, e.g., bags, or people, or large objects, such as left-behind vehicles. Object recognition, can also be applied to the sequence of images, when a left-behind object is detected.

Method Verification

To test the dual foreground method, we used several publicly available datasets, e.g. the well known surveillance videos available from PETS 2006 and AVSS 2007. The total number of tested sequences was 32. The test data include different pixel resolutions, e.g., 180×144, 320×240, 640×480, and 720×576. The scenarios ranged from lunch rooms to underground train stations. Most sequences contain small (10×10 pixels) left-behind objects. Some sequences have multiple left-behind objects. Half the sequences correspond to scenes where there are a relatively small numbers of people, e.g., up to three. The other half of the sequences has more complex scenarios with multiple sitting, standing, walking people. In both cases, people exhibit variable speeds. The objects are left for various durations, e.g., term seconds to two minutes.

To quantify the performance, we counted the number of false positives and number of false alarms for each sequence. The results are given in Table A below.

TABLE A

| Scenario | Number of frames | False Alarms | True Detections | Total Left-Behind Items |
|---|---|---|---|---|
| Set 1 | 4850 | 0 | 1 | 1 |
| Set 2 | 6600 | 0 | 6 | 6 |
| Set 3 | 13500 | 0 | 18 | 18 |
| Set 4 | 5700 | 1 | 5 | 5 |
| Set 5 & 6 | 3700 | 1 | 6 | 6 |
| Set 7 | 9500 | 0 | 10 | 11 |
| Set 8 | 3000 | 0 | 1 | 1 |

Set-1 is for an under ground train, station. Sets 2 and 3 are recorded from a wide angle camera of a cafeteria. Sets 4, 5, 6 are for different cameras from a lunch room. Set 7 is for a waiting lounge. Set 8 is for a large closed space platform with restaurants.

We determine the false alarm rate and detection rate as shown in Table B below.

TABLE B

| False Alarms Rate (percentage per second) | True Detection Rate |
|---|---|
| 0.27% | 97.92% |

Our results show that our method successfully detects almost all the left-behind objects, while achieving a very low false alarm rate. The method has 0.27% false alarm rate per second at a 97.92 true detection rate. We can identify objects left-behind by using an object classifier.

EFFECTS OF THE INVENTION

The left-behind object detection method is robust against erratic motion of people in the scene, illumination change, camera vibration, and other artifacts due to the Bayesian update background generation. Because our method does not depend on tracking, it is not restricted by the predefined event detection heuristics, i.e., a person brings an object and moves away some certain distance, etc., often employed by the tracking approaches that require detection and identification of every single object in the scene.

Unlike conventional motion vector analysis based approaches, we accurately detect the boundary of the left-behind objects in addition to detecting the occurrence of such an event. Our method is not limited to a maximum number of left-behind objects. Our method can detect instances in which some of the left-behind objects are removed from the scene and others still remain. If a left-behind object is occluded by another object or person later, our method can still detect it.

Furthermore, the detection performance of our method using a single camera is as good as the multi-camera based methods. In addition to the above advantages, our method is computationally suitable for real-time applications. Because our method can be divided Into multiple independent pixel-wise operations, it is also suitable for parallel processing.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting an object left-behind in a scene, comprising the steps of:

updating a set of background models using a sequence of images acquired of a scene by a camera, each background model updated at temporal scales, wherein the temporal scales range from short term to long term;

determining a foreground mask from each background model after the updating for a particular image of the sequence to produce a set of foreground masks;

updating a motion image from the set of foreground masks, in which each pixel in the motion image has an associated evidence value, in which the set of foreground masks include a long-term mask $F_L$ and a short-term mask $F_S$, and in which the updating of the motion image is according to evidence rules:

if $F_L(x, y)=0$ and $F_S(x, y)=0$, then the pixel (x, y) corresponds to a background in the scene, and a corresponding pixel I(x, y) in a current image is represented in both the corresponding background models $B_L$ and $B_S$;

if $F_L(x, y)=1$ and $F_S(x, y)=1$, then the pixel (x, y) corresponds to a moving object in the scene and is not represented in either of the background models $B_L$ or $B_S$;

if $F_L(x, y)=0$ and $F_S(x, y)=1$, then the pixel (x, y) corresponds to scene background, and the pixel I(x, y) in the current image is only represented in the $B_L$ model; and if $F_L(x, y)=1$ and $F_S(x, y)=0$, then pixel (x, y) may correspond to the left-behind object, and in which the updating of the motion image M(x, y) is $$M(x, y) = \begin{cases} M(x, y)+1 & F_L(x, y)=1 \quad \wedge \quad F_S(x, y)=0 \\ M(x, y)-k & F_L(x, y) \neq 1 \quad \vee \quad F_S(x, y) \neq 0 \\ max_e & M(x, y) > max_e \\ 0 & M(x, y) < 0 \end{cases},$$

where a threshold $max_e$ and a delay constant k positive numbers; and comparing the evidence values with an evidence threshold to detect and signal an object left behind in the scene.

2. The method of claim 1, in which the detecting is based an inference of intensities of pixels in the sequence of images evolving over time.

3. The method of claim 1, in which the temporal scales are learning rates at which parameters of the set of background models are updated.

4. The method of claim 1, in which each background model is maintained as a set layers, each layer being a multivariate Gaussian distribution, and in which parameters define each Gaussian distributions at any point in time during the updating.

5. The method of claim 4, in which the Gaussian distribution is multidimensional.

6. The method of claim 4, in which the updating of the set of background models uses a Bayesian mechanism comprising:

estimating in a probability distributions of a mean and a variance of the parameters of each layer.

7. The method of claim 6, in which an expectation of the mean and the variance for detecting the left-behind object, and a variance of the mean as a confidence score of the evidence values.

8. The method of claim 1, in which the updating of the motion image removes pixels in the motion image corresponding to slowly adapting background pixels and fast adapting foregrounds pixels, such that remaining pixels in the motion image correspond to the left-behind object.

9. The method of claim 1, in which the temporal scales depend on an application.

10. The method of claim 1, in which each foreground mask is a binary image having zero and one pixel values, and the one pixels values represent a possible foreground object in the sequence of images.

11. The method of claim 1, in which the set of background models are identical except for the temporal scale at the background models are updated.

12. The method of claim 1, further comprising:

applying connected components analysis on the pixels in the motion image and detecting and signaling the left-behind object according a size constraint.

13. The method of claim 1, further comprising:

applying connected components analysis on the pixels in the motion image and detecting and signaling the left-behind object according a pattern constraint.

* * * * *